United States Patent [19]

Smith, Jr.

[11] 4,059,651

[45] Nov. 22, 1977

[54] CURABLE BLENDS OF EPDM AND POLYPROPYLENE

[75] Inventor: William S. Smith, Jr., Freehold, N.J.

[73] Assignee: Exxon Research & Engineering Co., Linden, N.J.

[21] Appl. No.: 595,709

[22] Filed: July 14, 1975

Related U.S. Application Data

[63] Continuation of Ser. No. 18,699, March 11, 1970, abandoned.

[51] Int. Cl.² .................. C08L 19/00; C08L 61/14
[52] U.S. Cl. ........................... 260/848; 260/897 A
[58] Field of Search ................ 260/848, 889, 897 A

[56] References Cited

U.S. PATENT DOCUMENTS

| | | | |
|---|---|---|---|
| 3,701,702 | 10/1972 | Shichman et al. | 260/889 |
| 3,909,463 | 9/1975 | Hartman | 260/848 |

Primary Examiner—John C. Bleutge
Attorney, Agent, or Firm—Jack Matalon; John J. Mahon

[57] ABSTRACT

An EPDM elastomer (e.g. ethylene/propylene/ethylidene norbornene) is blended with polypropylene (70–98 wt. %) and a halogenated phenol resin (1–20 parts per 100 parts of the elastomer). The blend may be cured and molded to provide articles having high flexural modulus and high impact resistance at low temperatures.

5 Claims, No Drawings

CURABLE BLENDS OF EPDM AND POLYPROPYLENE

This is a continuation of application Ser. No. 18,699, filed Mar. 11, 1970 now abandoned.

THE PRIOR ART

It is well known (see e.g. British Pat. No. 975,877) to blend an amorphous ethylene-propylene copolymer with stereoregular polypropylene in order to improve the low temperature impact strength of the polypropylene. Such blends are not, however, "curable", since the usual curing agent for amorphous ethylene-propylene copolymers is a free radical-generating agent and the inclusion of such free radical-generating agents in the blend results in degradation of the polypropylene during temperatures associated with molding operations. The lack of a curing agent in such blends necessarily diminishes the low temperature impact resistance.

British Pat. No. 1,043,078 describes a curable blend of a major proportion of an ethylene/propylene/diene terpolymer and a minor proportion of a polyolefin which exhibits high resistance to cracking; in this patent, the curing system employed is the "sulfur-based" system, i.e. sulfur plus one or more sulfur accelerators and coagents such as zinc oxide, magnesium oxide, etc. However, this latter blend is disadvantageous from several points of view: (1) molded articles prepared from the cured blend have a significantly low flexural modulus due to the major proportion of terpolymer contained therein; (2) a "sulfur-based" curing system results in production of obnoxious odors, imparts undesirable color formation to the blend and requires very careful blending and temperature control in order to prevent either undercure or overcure since such curing system necessitates the use of many ingredients.

THE PRESENT INVENTION

It has now been unexpectedly found that it is possible to prepare molded articles from a novel blend of a major proportion of stereoregular polypropylene, a minor proportion of an EPDM elastomer and a halogenated phenol aldehyde resin (which acts as the curing agent). In the novel, curable blends of this invention, the polypropylene will generally be employed in an amount of about 70 to about 98 wt. % and the EPDM elastomer is generally employed in an amount of about 2 to about 30 wt. %, the amount of each component being based on the total amount of polypropylene plus elastomer. The halogenated phenol aldehyde resin will generally be present in an amount of about 1 to about 20 parts, per 100 parts of the EPDM elastomer. Best results are obtained when the EPDM elastomer is present in an amount of 5 to 15 wt. %, with the remainder being the polypropylene, based on the amount of the EPDM elastomer plus polypropylene. Preferably, the halogenated phenol aldehyde resin will be present in the amount of 2.5-10 parts, per 100 parts of the EPDM elastomer.

The polypropylene employed in this invention is the stereoregular type which is well known and widely used in the plastic field. This type of polypropylene will generally have molecular weights in the range of 300,000 to 1,000,000 or more and will have a heptane insolubility level usually of at least 90%; the melt flow rates of various grades of stereoregular polypropylene will generally be in the range of 0.1-20 dg./min. or higher.

The term "EPDM" utilized in the description of this invention is found in ASTM-D-1418-64 and describes a terpolymer containing ethylene and propylene in the backbone and a diene in the side chain. EPDM elastomers are well known in the prior art and may be prepared by processes such as those described in U.S. Pat. No. 3,280,082, British Pat. No. 1,030,989 and French Pat. No. 1,386,600, which are incorporated herein by reference.

The EPDM elastomers which are suitable for the purposes of the present invention generally contain about 40 to about 80 wt. % ethylene and about 2.0 to about 12 wt. % of a diene monomer, with the balance of the elastomer being propylene. Preferably, the EPDM elastomer contains about 50 to about 60 wt. % ethylene, e.g. 56 wt. %, and about 2.6 to about 4.0 wt. % diene monomer, e.g. 3.3 wt. %.

The diene monomer in the EPDM elastomer is preferably a nonconjugated diene. Illustrative of the nonconjugated diene monomers which may be used in the EPDM elastomer are 1,5-hexadiene, dicyclopentadiene, methylene norbornene, ethylidene norbornene, propylidene norbornene, tetrahydroindene, and 5-methyl tetrahydroindene; the preferred monomer in the EPDM elastomer for the purposes of the present invention is ethylidene norbornene.

The term "halogenated phenol aldehyde resin" as used in the description of the present invention is intended to mean both monomeric and polymeric halomethyl hydrocarbon-substituted phenols. The monomeric form of these curing agents falls under the general formula:

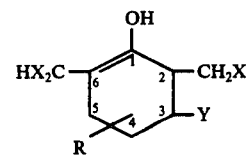

wherein R is an alkyl, aryl or alkenyl hydrocarbon containing 4 to 16 carbon atoms located in the meta or para positions (4–5 positions), X is a halogen such as fluorine, chlorine, bromine or iodine, and Y is hydrogen or hydroxy.

Products obtained by the controlled halogenation of methylol-containing resins prepared by the condensation of an aldehyde, e.g. formaldehyde, with the following representative phenols: 4-tertiary-butyl phenol, 4-phenyl phenol and 4-monoxy phenol, are within the purview of the halogenated phenol aldehyde resins suitable for use in this invention. These halomethyl hydrocarbon substituted phenol compounds and their preparation are fully described in U.S. Pat. Nos. 3,093,613 and 3,165,496 which are incorporated herein by reference.

Preferably, the halogenated phenol aldehyde resin is a bromomethyl alkylated phenol aldehyde resin having a methylol content of about 9–14% and a bromine content of about 3–9%. Illustrative of the preferable halogenated phenol aldehyde resins are those prepared by Schenectady Chemicals, Inc. and identified as resins SP 1055 and SP 1056. Both resins are heat reactive bromomethyl alkylated phenolic resins with a melting point of about 125° F. The SP 1055 resin has a methylol content of about 11.25% and a bromine content of about 3.5%, whereas the SP 1056 resin has a methylol content of about 11% and a bromine content of about 7%.

The novel blends of the present invention may be prepared by one of three methods using conventional mixing techniques, e.g. kneading, roller milling, extruding, banbury mixing, etc. In one method, the novel blends are prepared by concurrently mixing the polypropylene, EPDM elastomer and halogenated phenol aldehyde resin at temperatures above the melting point of the polypropylene, e.g. 300°-400° F., preferably 310°-350° F. The mixing operations are generally completed within a few minutes, depending upon the quantity of blends and the type of mixing apparatus; care should be taken to avoid overmixing at the elevated temperatures since this may result in premature complete cure of the EPDM elastomer component of the blend (it is preferred that complete cure of the EPDM elastomer component of the blend be effected during the molding operations). The blend is then cooled and packaged, i.e. conveniently in the form of extruded pellets. The blend may thereafter be processed in conventional molding equipment, e.g. by injection molding machines into the desired shape utilizing molding cycles, temperatures and pressures which will bring about the desired shape and thickness of the molded article and which will concurrently result in a substantially complete cure of the EPDM elastomer component of the blend; as a general matter, injection molding may take place at temperatures in the range of 350° to 600° F., for 0.5-10 min. or more and injecting into a room-temperature mold at 500 to 3000 psi, depending upon the desired shape and thickness of the molded article.

A second method for preparing the blends is similar to that described above, except that the halogenated phenol aldehyde resin is first mixed with the polypropylene at temperatures above the melting point of the polypropylene (i.e. 300°-400° F., preferably 310°-350° F.) and thereafter the EPDM elastomer is mixed with the polypropylene-resin mixture. The final blend is then packaged and molded in the manner described above.

Preferably, the blends of this invention are prepared by initially mixing the halogenated phenol aldehyde resin with the EPDM elastomer at temperatures of less than 250° F., e.g. 180° to 230° F. The polypropylene is then mixed with the EPDM elastomer-resin mixture at temperatures above the melting point of the polypropylene (i.e. 300°-400° F., preferably 310°-350° F.) and the final blend is then cooled, packaged and molded as described above. This third method of preparing the blends of this invention is preferred since it assures intimate mixing of the EPDM elastomer and the resin curing agent (the polypropylene component of the blend is not "curable").

This invention will be better understood with reference to the following examples in which all parts of the components are on a weight basis.

EXAMPLE 1

Set forth below in Table I are the materials, together with the identification of such materials, which are employed in Examples 2-34.

TABLE I

| Materials | Identification |
|---|---|
| PP | Commercially available, stereo-regular polypropylene having a melt flow rate of 0.5 dg./min. |
| SP 1055 | Commercially available, brominated phenol aldehyde resin having a melting point of about 124° F., a methylol content of about 11% and a bromine content of about 3.5%. |
| EPC A | Commercially available, amorphous elastomeric ethylene/propylene copolymer with an ethylene content of about 45 wt. %, a Mooney viscosity of about 25 (ML 8 min. at 260° F.) and an inherent viscosity of 2.9 (decalin at 135° C.). |
| EPC B | Commercially available, 25% crystalline (by X-ray diffraction), ethylene/propylene copolymer having a propylene content of about 15 wt. % and a Mooney viscosity of 38 (MS 8 min. at 260° F.). |
| Butyl | Commercially available butyl rubber having an isoprene content of about 1.5 mole % and a Mooney viscosity of 55 (ML 3 min. at 260° F.). |
| Butyl HT | Commercially available, chlorinated butyl rubber having a chlorine content of about 1.2 wt. %, an isoprene content of about 1.4 mole % and a Mooney viscosity of 55 (ML 3 min. at 260° F.). |
| EPDM A | Commercially available, ethylene/propylene/methylene norbornene terpolymer having an ethylene content of 60 wt. %, methylene norbornene content of 3 wt. %, a Mooney viscosity of 30 (ML 8 min. at 260° F.) and an inherent viscosity of 2.7 (decalin at 135° C.). |
| EPDM B | Commercially available, ethylene propylene/methylene norbornene terpolymer having an ethylene content of 57 wt. %, a methylene norbornene content of 3 wt. %, a Mooney viscosity of 60 (ML 8 min. at 260° F.) and an inherent viscosity of 3.2 (decalin at 135° C.). |
| EPDM C | Commercially available, ethylene/propylene/methylene norbornene terpolymer having an ethylene content of 77 wt. %, a methylene norbornene content of 3 wt. %, a Mooney viscosity of 50 (ML 8 min. at 260° F.) and an inherent viscosity of 2.9 (decalin at 135° C.). |
| EPDM D | Commercially available, ethylene/propylene/ethylidene norbornene terpolymer having an ethylene content of 60 wt. %, an ethylidene norbornene content of 3 wt. %, a Mooney viscosity of 30 (ML 8 min. at 260° F.) and an inherent viscosity of 2.7 (decalin at 135° C.). |
| EPDM E | Commercially available, ethylene/propylene/ethylidene norbornene terpolymer having an ethylene content of 57 wt. %, an ethylidene norbornene content of 3 wt. %, a Mooney viscosity of 60 (ML 8 min. at 260° F.) and an inherent viscosity of 3.2 (decalin at 135° C.). |
| EPDM F | Commercially available, ethylene/propylene/ethylidene norbornene terpolymer having an ethylene content of 77 wt. %, an ethylidene norbornene content of 3 wt. %, a Mooney viscosity of 50 (ML 8 min. at 260° F.) and an inherent viscosity of 2.9 (decalin at 135° C.). |
| EPDM G | Commercially available, ethylene/propylene/ethylidene norbornene terpolymer having an ethylene content of 58 wt. %, an ethylidene norbornene content of 9 wt. %, a Mooney viscosity of 50 (ML 8 min. at 260° F.) and an inherent viscosity of 2.2 (decalin at 135° C.). |

TABLE I-continued

| Materials | Identification |
|---|---|
| EPDM H | Commercially available, ethylene/propylene/hexadiene-1,5 terpolymer having an ethylene content of about 60 wt. %, an iodine number of about 10, and a Mooney viscosity of 47 (ML 4 min. at 260° F.). |
| EPDM I | Commercially available, ethylene/propylene/hexadiene-1,5 terpolymer having an ethylene content of about 60 wt. %, an iodine number of about 10 and a Mooney viscosity of 70 (ML 4 min. at 260° F.). |
| EPDM J | Commercially available, ethylene/propylene/hexadiene-1,5 terpolymer having an ethylene content of about 70 wt. %, an iodine number of about 10 and a Mooney viscosity of 55 (ML 4 min. at 260° F.). |

EXAMPLES 2-34

In the following examples 2-34, the indicated materials and parts thereof were blended by initially mixing the elastomer and halogenated phenol aldehyde resin in a Banbury (3 lb. capacity) for 5 min. at a temperature of about 225° F. The elastomer-resin mixture was then blended with the polypropylene in a Banbury (25 lb. capacity) for about 5 min. at a maximum temperature of about 350° F.; the blend was then cooled, ground into chips and molded into test specimens. The physical properties of the various blends are set forth in Table II below.

TABLE II

| Ex. | Blend | Tensile at Yield, psi | Elong. at Yield, % | Flex. Mod., psi ×10⁻⁵ | Izod Impact, ft.-lbs./in. 72° F., Notched | 0° F., Notched | −20° F., Un-notched | −40° F., Un-notched | Melt Flow g./10 min. |
|---|---|---|---|---|---|---|---|---|---|
| 2 | PP, 100 | 5000 | 18 | 1.83 | 2.3 | 0.4 | 5 | 5 | 0.5 |
| 3 | PP, 90 EPC A, 10 | 3800 | 21 | 1.30 | 8.4 | 0.8 | 20 | 15 | 0.5 |
| 4 | PP, 90 EPC B, 10 | 4400 | 19 | 1.42 | 4.2 | 0.6 | 9 | 7 | 0.4 |
| 5 | PP, 90 Butyl, 10 | 4100 | 20 | 1.39 | NB* | 0.4 | 13 | 6 | 0.5 |
| 6 | PP, 90 Butyl, 10 SP 1055, 0.25 | 4400 | 19 | 1.55 | NB* | 0.9 | 23 | 15 | 0.1 |
| 7 | PP, 90 Butyl HT, 10 | 4100 | 20 | 1.31 | 14 | 0.3 | 8 | 7 | 0.7 |
| 8 | PP, 90 Butyl HT, 10 ZnO, 0.5 | 4200 | 20 | 1.49 | NB* | 0.7 | 21 | 14 | 0.2 |
| 9 | PP, 90 EPDM A, 10 | 3900 | 20 | 1.26 | 10.7 | — | 15 | 11 | 0.9 |
| 10 | PP, 80 EPDM A, 20 | 3300 | 24 | 1.07 | 19.5 | — | >30 | 24 | 0.9 |
| 11 | PP, 70 EPDM A, 30 | 2700 | 33 | 0.83 | 17.6 | — | NB* | NB* | — |
| 12 | PP, 90 EPDM B, 10 | 4100 | 19 | 1.41 | 7.0 | — | 23 | 22 | 0.3 |
| 13 | PP, 80 EPDM B, 20 | 3200 | 22 | 1.06 | 19 | — | >30 | >30 | — |
| 14 | PP, 70 EPDM B, 30 | 2500 | 29 | 0.78 | 17 | — | >30 | >30 | — |
| 15 | PP, 90 EPDM C, 10 | 4100 | 19 | 1.37 | 16.0 | — | >30 | NB* | 0.8 |
| 16 | PP, 80 EPDM C, 20 | 3500 | 22 | 1.13 | 20.4 | — | NB* | NB* | 0.7 |
| 17 | PP, 70 EPDM C, 30 | 2900 | 28 | 0.91 | 17.0 | — | NB* | NB* | — |
| 18 | PP, 90 EPDM D, 10 | 3900 | 23 | 1.36 | 9.4 | 0.4 | 9 | 7 | — |
| 19 | PP, 90 EPDM D, 10 SP 1055, 1 | 4100 | 23 | 1.37 | 19.8 | 1.2 | 27 | 22 | — |
| 20 | PP, 90 EPDM E, 10 | 4100 | 20 | 1.39 | 7.9 | 0.8 | 16 | 12 | 0.3 |
| 21 | PP, 90 EPDM E, 10 SP 1055, 0.5 | 4200 | 20 | 1.44 | 13 | 1.3 | 29 | 22 | 0.2 |
| 22 | PP, 90 EPDM F, 10 | 4300 | 21 | 1.44 | 8.5 | 0.6 | 13 | 10 | 0.4 |
| 23 | PP, 90 EPDM F, 10 SP 1055, 0.5 | 4400 | 20 | 1.44 | 10.4 | 1.0 | 28 | 19 | 0.2 |
| 24 | PP, 90 EPDM G, 10 | 4100 | 20 | 1.47 | 9.8 | 0.5 | 11 | 7 | 0.4 |
| 25 | PP, 90 EPDM G, 10 SP 1055, 0.5 | 4300 | 20 | 1.55 | 12.4 | 1.3 | 31 | 20 | 0.1 |
| 26 | PP, 90 EPDM H, 10 | 3800 | 21 | 1.21 | 5.8 | — | 28 | 15 | — |
| 27 | PP, 80 EPDM H, 20 | 3100 | 25 | 0.96 | 18.4 | — | NB* | 40 | 0.8 |
| 28 | PP, 70 EPDM H, 30 | 2400 | 31 | 0.72 | 17.5 | — | NB* | NB* | — |
| 29 | PP, 90 EPDM I, 10 | 4000 | 20 | 1.25 | 5.2 | — | 27 | 17 | — |
| 30 | PP, 80 EPDM I, 20 | 3300 | 22 | 0.99 | 7.9 | — | NB* | NB* | 0.5 |
| 31 | PP, 70 | 2800 | 25 | 0.84 | 17 | — | NB* | 36 | — |

TABLE II-continued

| Ex. | Blend | Tensile at Yield, psi | Elong. at Yield, % | Flex. Mod., psi ×10⁻⁵ | Izod Impact, ft.-lbs./in. | | | | Melt Flow g./10 min. |
|---|---|---|---|---|---|---|---|---|---|
| | | | | | 72° F., Notched | 0° F., Notched | −20° F., Un-notched | −40° F., Un-notched | |
| 32 | EPDM I, 30 PP, 90 | 3900 | 19 | 1.32 | 9.1 | — | 21 | 14 | — |
| 33 | EPDM J, 10 PP, 80 | 3200 | 23 | 1.06 | 20.3 | — | NB* | NB* | 0.9 |
| 34 | EPDM J, 20 PP, 70 EPDM J, 30 | 2600 | 47 | 0.83 | 18.3 | — | NB* | NB* | — |

*NB = no break.

Inspection of Table II indicates that the tensile strength and flexural modulus of polypropylene (Example 2) is reduced somewhat by the addition of an elastomeric ethylene/propylene copolymer or terpolymer (this is in accord with the expectation that addition of elastomers would have such an effect). However, the addition of the elastomers brings about a marked improvement in low temperature Izod impact resistance (a very important physical property for molded articles.) The further addition of the halogenated phenol aldehyde resin curing agent results in a slight rise in tensile strength and a severalfold increase in low temperature Izod impact resistance (e.g. compare Examples 18 and 19, 20 and 21, 22 and 23, and 24 and 25).

While the above examples illustrate the invention in great detail, it should be understood that this invention in its broadest aspects is not necessarily limited to the specific materials, conditions and procedures shown therein. The present invention is limited only by the claims which follow.

What is claimed is:

1. A molded article exhibiting improved impact resistance in the cured state, said article being prepared from a polymer blend consisting essentially of:

a. 2 to 30% by weight of a cross-linkable EPDM elastomer wherein the diene component of said EPDM is ethylidene norbornene and said EPDM containing 1 to 20 parts per hundred of a bromomethyl alkylated phenol aldehyde resin as a cross-linking agent to effect curing of said elastomer; and b. 70 to 98% by weight of a stereoregular polypropylene, said polypropylene being an uncurable component, said elastomer being blended with polypropylene at a temperature above the melting point of the polypropylene, and said cross-linkable EPDM being completely cured by said resin when said blend is subjected to molding temperatures of 350° to 650° F.

2. The molded article of claim 1 wherein said resin has a methylol content of about 9–14% and a bromine content of about 3–9%.

3. The molded article of claim 1 wherein said (a) component is present in an amount from 5 to 15% by weight.

4. The molded article of claim 1 having an Izod impact resistance value of 27 to 31 ft.-lbs./in. at −20° F.

5. The molded article of claim 1 wherein about 10% by weight of said EPDM is present.

* * * * *